(12) United States Patent
Kouyama

(10) Patent No.: US 8,300,292 B2
(45) Date of Patent: Oct. 30, 2012

(54) OPTICAL SCANNER, IMAGE DISPLAY APPARATUS HAVING OPTICAL SCANNER AND DRIVING METHOD OF OPTICAL SCANNER

(75) Inventor: Masatoshi Kouyama, Gifu (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 300 days.

(21) Appl. No.: 12/827,212

(22) Filed: Jun. 30, 2010

(65) Prior Publication Data

US 2010/0328745 A1 Dec. 30, 2010

(30) Foreign Application Priority Data

Jun. 30, 2009 (JP) ................................. 2009-155047

(51) Int. Cl.
G02B 26/08 (2006.01)

(52) U.S. Cl. .................. 359/224.1; 359/212.1

(58) Field of Classification Search .... 359/212.1–214.1, 359/221.1, 223.1–226.2, 290, 291, 871, 872
See application file for complete search history.

(56) References Cited

U.S. PATENT DOCUMENTS 7,394,583 B2 7/2008 Akedo et al.

2008/0284523 A1 11/2008 Watanabe
2009/0185253 A1* 7/2009 Tani et al. ................. 359/221.2

FOREIGN PATENT DOCUMENTS

| JP | 2004-29064 | 1/2004 |
|---|---|---|
| JP | 2005-257811 | 9/2005 |
| JP | 2006-293116 | 10/2006 |
| JP | 2007-240626 | 9/2007 |
| JP | 2008-310301 | 12/2008 |

* cited by examiner

*Primary Examiner* — Euncha Cherry
(74) *Attorney, Agent, or Firm* — Scully, Scott, Murphy & Presser, PC

(57) ABSTRACT

An optical scanner including a base body, a drive unit, a deflection status detector and a controller is provided. The base body has a non-linear frequency characteristic and has a first resonance frequency and a second resonance frequency. The controller includes a first upsweep unit which upsweeps a drive frequency from a frequency lower than the first resonance frequency; a dropping phenomenon detector which detects the dropping phenomenon; a target drive frequency determination unit which determines a frequency lower than a frequency at which the dropping phenomenon is detected, as a target drive frequency; a second upsweep unit which upsweeps the drive frequency toward the target drive frequency from a frequency lower than the first resonance frequency; and an adjustment unit which adjusts the drive frequency of the drive signal to keep the deflection status at the target drive frequency after the operation of the second upsweep unit.

13 Claims, 12 Drawing Sheets

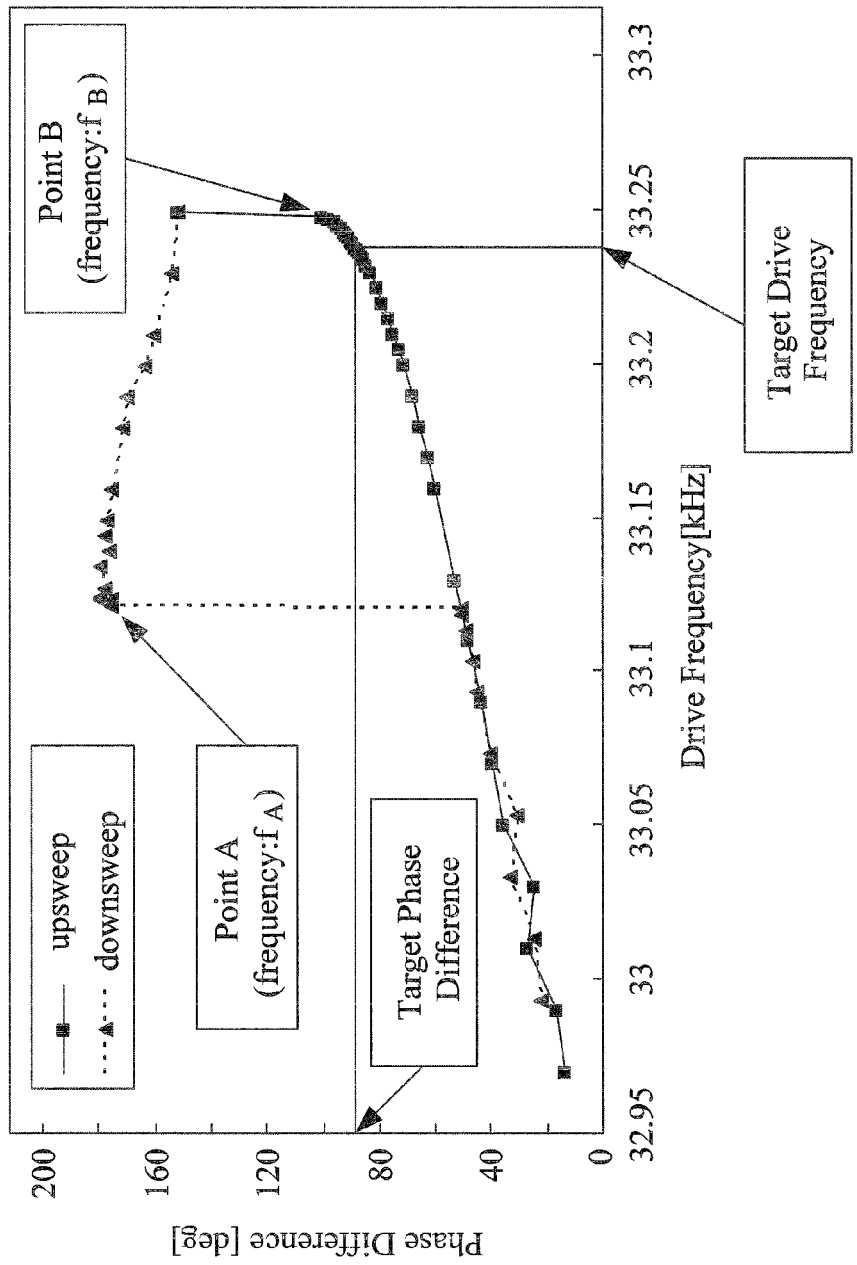

OPTICAL SCANNER, IMAGE DISPLAY APPARATUS HAVING OPTICAL SCANNER AND DRIVING METHOD OF OPTICAL SCANNER

CROSS-REFERENCE TO RELATED APPLICATION

This application claims priority from Japanese Patent Application No. 2009-155047 filed on Jun. 30, 2009, the entire subject matter of which is incorporated herein by reference.

TECHNICAL FIELD

Aspects of the present invention relate to an optical scanner that is used in a laser printer or image display apparatus, in particular, to an optical scanner having a MEMS mirror, an image display apparatus using the optical scanner and a method for driving the optical scanner.

BACKGROUND

A Micro-Electro-Mechanical Systems (MEMS) mirror has been used as a micro-sized optical scanner. An optical scanner is used in a laser printer or an image display apparatus, for example. When an optical seamier is used in an image display apparatus, a field of view of a display image depends on a deflection angle of the optical scanner. Accordingly, it is advantageous to use the optical scanner having a larger deflection angle to display a large and precise image. A method of driving an optical scanner at a resonance frequency of the optical scanner (resonance-drive) is effective to enlarge a deflection angle of the optical scanner. In addition, in order to achieve a larger deflection angle, it is advantageous to resonance-drive an optical scanner having a great Q value (typically, about $10^3$) that indicates a resonance characteristic.

For resonance-driving of an optical scanner, a drive frequency for driving the optical scanner is set to be equal to a resonance frequency of the optical scanner. In particular, in order to resonate an optical scanner having a great Q value, a drive frequency is required to precisely coincide with a resonance frequency. However, the resonance frequency of the optical scanner is not always constant. In other words, the resonance frequency of the optical scanner varies by disturbances such as temperature change, secular change and the like. JP-A-2008-310301 describes a method of determining a resonance frequency of an optical scanner. The method includes up-down sweeping a drive frequency over a frequency range including a resonance frequency of the optical scanner. Then, based on at least two frequencies that cause a deflection angle to be maximum during the up-down sweep, the resonance frequency of the optical scanner is determined. Based on the determined resonance frequency, a drive signal is generated, so that a resonance driving can be performed.

A frequency characteristic of an optical scanner, i.e., a relation between a drive frequency and a deflection angle can be classified into two types, i.e., linear and non-linear frequency characteristic. In an optical scanner having a linear frequency characteristic, a drive frequency and a deflection angle correspond to each other one-to-one. In contrast, in an optical scanner having a non-linear frequency characteristic, a drive frequency and a deflection angle does not correspond to each other one-to-one.

In general, an optical scanner having a non-linear frequency characteristic can obtain a deflection angle larger than that of an optical scanner having a linear frequency characteristic at a predetermined drive voltage. In other words, in order to obtain a large deflection angle, the optical scanner having a non-linear frequency characteristic is suitable rather than the optical scanner having a linear frequency characteristic.

The technique described in JP-A-2008-310301 is proposed for an optical scanner having a linear frequency characteristic. Accordingly, that technique cannot be applied to an optical scanner having a non-linear frequency characteristic.

SUMMARY

Accordingly, it is an aspect of the present invention to provide an optical scanner which has a non-linear frequency characteristic and is capable of performing a constant drive realizing a large deflection angle, an image display apparatus having the optical scanner and a method of driving the optical scanner.

According to an illustrative embodiment of the present invention, there is provided an optical scanner comprising a scanner base body, a drive unit, a deflection status detector and a controller. The scanner base body includes a deflection mirror configured to deflect incident light in a predetermined direction, a support beam extending from the deflection mirror and supporting the deflection mirror, and a fixing part, to which an end of the support beam is connected. The scanner base body is configured to have a first resonance frequency and a second resonance frequency higher than the first resonance frequency, resonate at the second resonance frequency when the drive frequency is increased from a frequency lower than the first resonance frequency, resonate at the first resonance frequency when the drive frequency is decreased from a frequency higher than the first resonance frequency, and exhibit a dropping phenomenon that the deflection status is decreased when the drive frequency exceeds the second resonance frequency while the scanner base body is driven at the second resonance frequency. The drive unit is configured to rotationally oscillate the deflection mirror and the support beam, thereby driving the scanner base body. The deflection status detector is configured to detect a deflection status of the deflection mirror. The controller configured to generate a drive signal for driving the scanner base body with a drive frequency and configured to transmit the drive signal to the drive unit. The controller includes a first upsweep unit, a dropping phenomenon detector, a target drive frequency determination unit, a second upsweep unit and an adjustment unit. The first upsweep unit is configured to upsweep a drive frequency of the drive signal from a frequency lower than the first resonance frequency. The dropping phenomenon detector is configured to detect the dropping phenomenon based on a detection result of the deflection status detector. The target drive frequency determination unit is configured to, when the dropping phenomenon detector detects the dropping phenomenon at a drive frequency during the upsweeping by the upsweep unit, determine a frequency lower than the drive frequency at which the dropping phenomenon is detected, as a target drive frequency. The second upsweep unit is configured to upsweep the drive frequency of the drive signal toward the target drive frequency from a frequency lower than the first resonance frequency after the operation of the target drive frequency determination unit. The adjustment unit is configured to adjust the drive frequency of the drive signal so as to keep the deflection status at the target drive frequency based on the detection result of the deflection status detector after the operation of the second upsweep unit.

According to another illustrative embodiment of the present invention, there is provided an image display apparatus comprising the above-described optical scanner for scanning light to form an image, a light source configured to supply light to the optical scanner, and an eyepiece optical system configured to guide the light scanned by the optical scanner to an eye of a user.

According to a further illustrative embodiment of the present invention, there is provided a method of driving an optical scanner. The method comprises first upsweeping a drive frequency of a drive signal to be transmitted to a drive unit configured to drive the optical scanner, from a frequency lower than the first resonance frequency; detecting a deflection status of the optical scanner; detecting the dropping phenomenon based on a detection result of the deflection status; when the dropping phenomenon is detected at a drive frequency during the first upsweeping, determining a frequency lower than the drive frequency at which the dropping phenomenon is detected as a target drive frequency; second upsweeping the drive frequency of the drive signal toward the target drive frequency from a frequency lower than the first resonance frequency after determining the target drive frequency; and adjusting the drive frequency of the drive signal so as to keep the deflection status at the target drive frequency based on the detection result of the deflection status after the second upsweeping. The method is applied to an optical scanner configured to (1) have a first resonance frequency and a second resonance frequency higher than the first resonance frequency, (2) resonate at the second resonance frequency when the drive frequency is increased from a frequency lower than the first resonance frequency, (3) resonate at the first resonance frequency when the drive frequency is decreased from a frequency higher than the first resonance frequency, and (4) exhibit a dropping phenomenon that the deflection status is decreased when the drive frequency exceeds the second resonance frequency while the scanner base body is driven at the second resonance frequency.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 7 is a view showing measured values of a relationship between a drive frequency and a phase difference;

DETAILED DESCRIPTION

Illustrative Embodiment

[Configuration of Optical Scanner 10]

Figure 2:
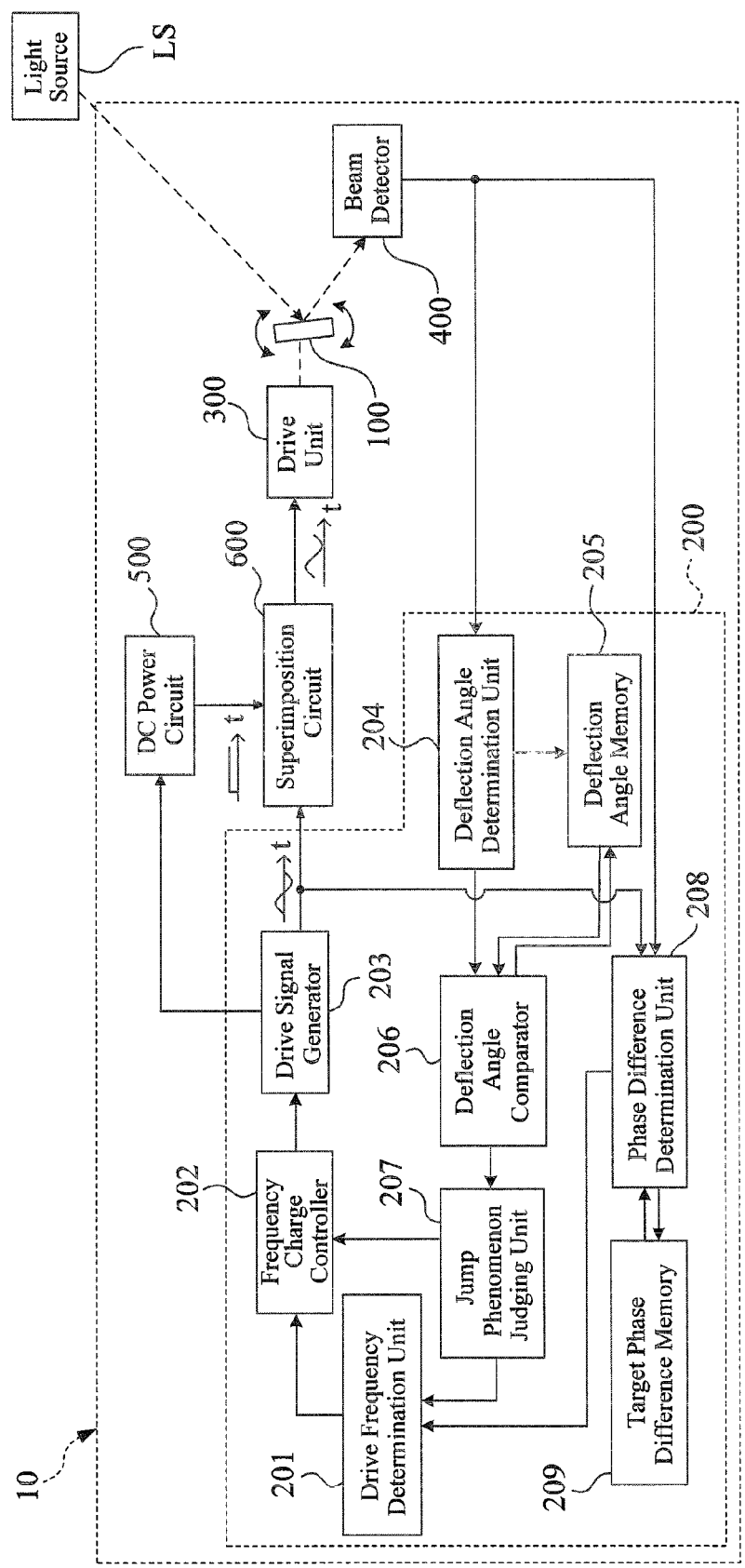
FIG. 2 is a functional block diagram of an optical scanner 10.

As shown in FIG. 2, an optical scanner 10 includes a scanner base body 100, a controller 200, a drive unit 300, a beam detector 400, a DC power circuit 500 and a superimposition circuit 600. A light source LS that generates light to be incident on the scanner base body 100 is provided outside the optical scanner 10. Hereinafter, each component provided to the optical scanner 10 will be described.

The scanner base body 100 scans the incident light in a predetermined direction. The scanner base body 100 has a non-linear frequency characteristic. The drive unit 300 provided to the scanner base body 100 rotationally oscillates the scanner base body 100 based on a drive signal from the controller 200. Hereinafter, the scanner base body 100 and the drive unit 300 will be described with reference to FIG. 3.

[Mechanical Structure of Scanner Base Body 100 and Drive Unit 300]

Figure 3:
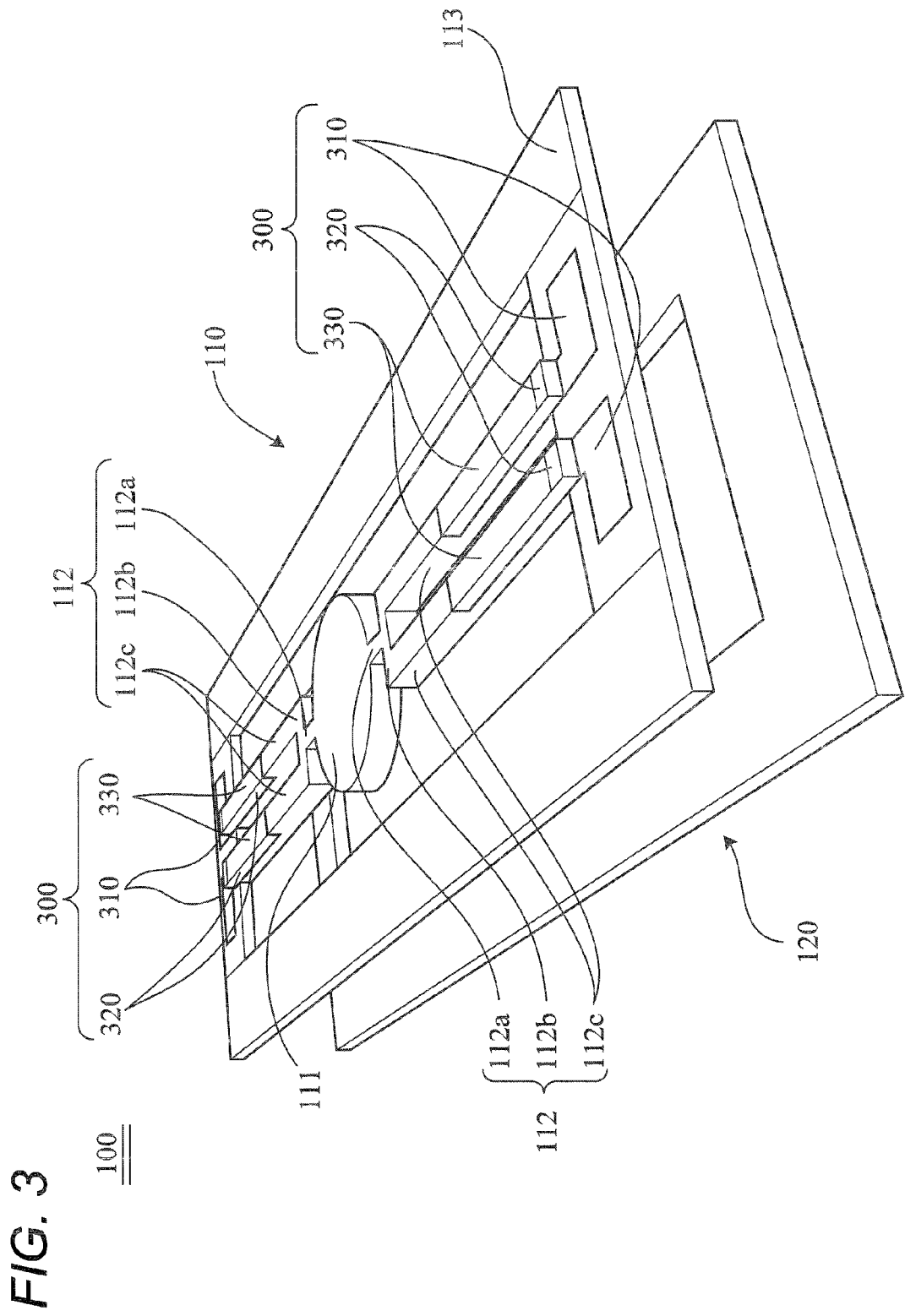
FIG. 3 is a perspective view illustrating the scanner base body 100 and a drive unit 300.

As shown in FIG. 3, the scanner base body 100 includes an oscillating member 110 and a pedestal member 120. The oscillating member 110 includes a deflection mirror 111, support beams 112 and an outer frame 113. The deflection mirror 111 having is approximately circular shape when seen from the plan view is provided at a center of the oscillating member 110. The support beams 112 connected to the deflection mirror 111 support the deflection mirror 111 at both sides thereof. Each of the support beams 112 includes a mirror support part 112a, a connection part 112b and a pair of beam parts 112c. One end of the mirror support part 112a is connected to the deflection mirror 111. The other end of the mirror support part 112a is connected to the connection part 112b. The connection part 112b is connected to the mirror support part 112a to be orthogonal to the mirror support part 112a. Both ends of the connection part 112b are connected to the beam parts 112c, respectively. One ends of the beam parts 112c are respectively connected to the connection part 112b so to be orthogonal to the connection part 112b. The other ends of the beam parts 112c are respectively connected to the outer frame 113 to be orthogonal to the outer frame 113. The outer frame 113 serving as a fixing part has a rectangular frame shape and is provided around the deflection mirror 111 and the support beams 112. The oscillating member 110 can be manufactured by etching a thin and long silicon substrate having a thickness of about 30 μm to 200 μm, for example. Further, the oscillating member 110 may be made of a material other than silicon. For example, the oscillating member 110 may be made of metal such as stainless, for example, SUS304 or SUS430, titanium, iron and the like.

The pedestal member 120 has a rectangular frame shape having a size same as the outer frame 113. The pedestal member 120 can be manufactured by blast-processing glass substrate, for example. The pedestal member 120 and the oscillating member 110 are fixed by adhesion, anodic bonding and the like, so that the scanner base body 100 is formed.

The drive units 300 are provided on the scanner base body 100 so as to rotationally oscillate the deflection mirror 111 and the support beams 112. Each of the drive units 300 includes lower electrodes 310, piezoelectric elements 320 and upper electrodes 330. The lower electrodes 310 are formed over from surfaces of the beam parts 112c to the outer frame 113. The lower electrodes 310 are formed by depositing platinum (Pt) or gold (Au) in a thickness of 0.2 μm to 0.6 μm with a film forming method such as sputtering or vapor deposition, for example. The piezoelectric elements 320 are formed on the lower electrodes 310. The piezoelectric elements 320 are formed by depositing piezoelectric elements such as PZT in a thickness of 1 μm to 3 μm with a film forming method such as aerosol deposition method (for example, refer to JP-A-2007-91416). The upper electrodes 330 are formed on the piezoelectric elements 320, respectively. The upper electrodes 330 are formed by the method same as that of the lower electrodes 310. In the meantime, the lower electrodes 310 and the upper electrodes 330 are electrically connected to the superimposition circuit 600 via a wiring cable (not shown). In addition, it may be possible that a bulk piezoelectric element having upper and lower electrodes formed thereto in advance is adhered, so that the drive units 300 are formed. Furthermore, the deflection mirror 111 and the support beams 112 may be oscillated by a drive mechanism instead of the piezoelectric element. For example, an electrostatic drive mechanism may be adopted in which a pair of electrodes is provided to a backside of the deflection mirror 111 and the pedestal member 120 and the deflection mirror is thus oscillated by Coulombic force. Alternatively, an electromagnetic drive mechanism may be adopted in which a coil is provided to a backside of the deflection mirror 111, a permanent magnet is provided to the pedestal member 120 and the deflection mirror is thus oscillated by magnetic force.

The operation of the scanner base body 100 will be described. As applying voltage between the lower electrodes 310 and the upper electrodes 330, the polarized piezoelectric elements 320 expand and contract in a longitudinal direction of the pair of the beam parts 112c. Since the piezoelectric elements 320 are fixed to the pair of beam parts 112c and the outer frame 113 through the lower electrodes 310, the extraction and contraction of the piezoelectric elements 320 is converted into flexural displacement which is a displacement of the pair of beam parts 112c in a thickness direction of the scanner base body 100. In other words, the drive units 300 serve as a unimorph. The flexural displacement of the beam parts 112c is converted into rotational torque for oscillating the deflection mirror 111 through the connection parts 112b.

The scanner based body 100 configured as described above has a non-linear frequency characteristic. Hereinafter, a characteristic of the scanner base body 100 having a non-linear frequency characteristic will be described with reference to FIG. 1.

Figure 1:
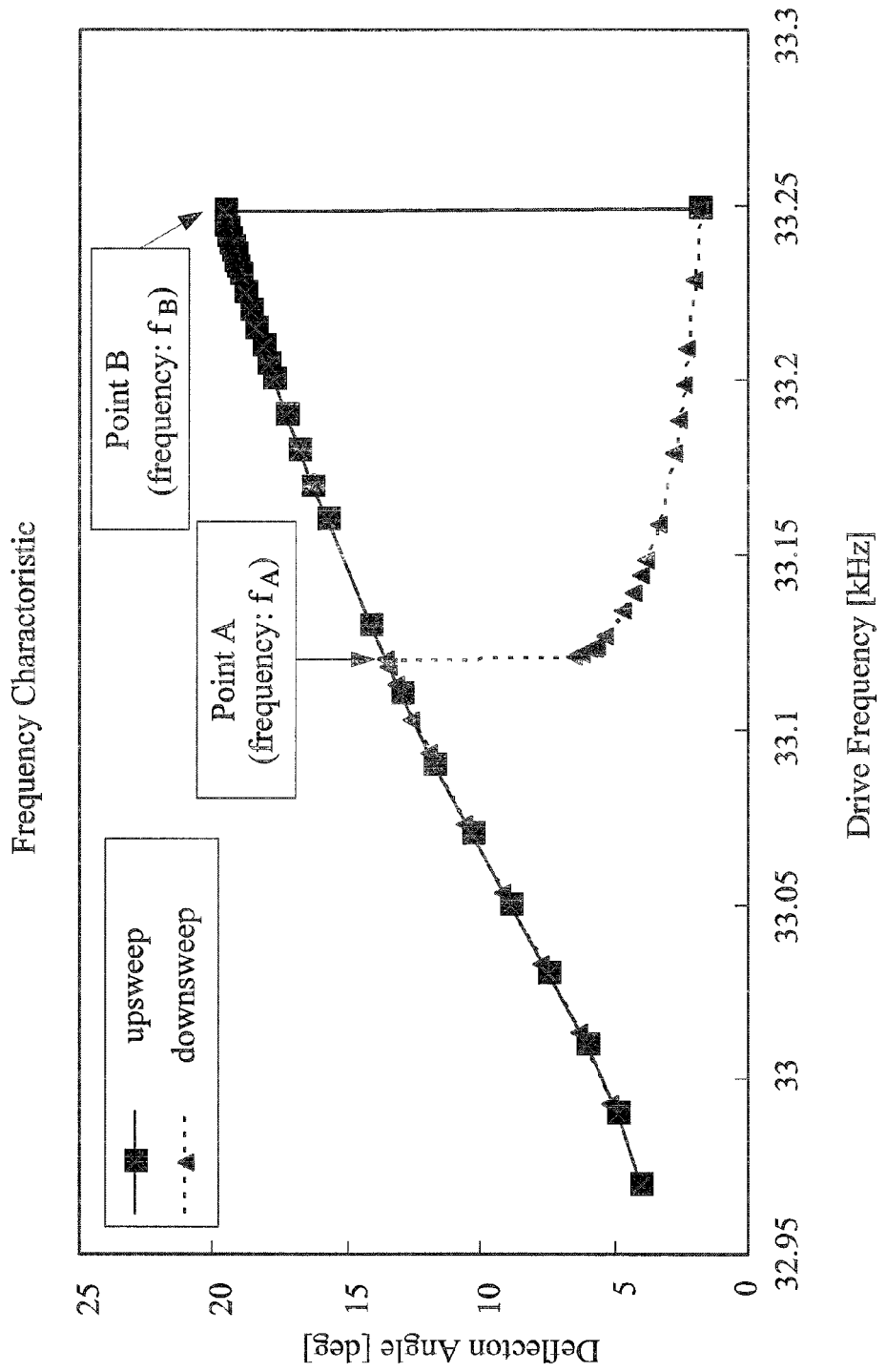
FIG. 1 shows measured values of frequency characteristic of a scanner base body 100.

In FIG. 1, a horizontal axis indicates a drive frequency with which the scanner base body 100 is driven and a vertical axis indicates a deflection angle of the deflection mirror 111 of the scanner base body 100. In FIG. 1, when upsweeping a drive frequency, a deflection angle varies as shown with filled squares and solid line. In FIG. 1, when downsweeping the drive frequency, the deflection angle varies as shown with filled triangles and a dotted line.

That is, the scanner base body 100 having a non-linear frequency characteristic exhibits two characteristic phenomena: (1) jump and (2) hysteresis. The jump phenomenon is a phenomenon that a deflection angle is largely changed by a slight change of a drive frequency. Specifically, the jump phenomenon includes an increase phenomenon that a deflection angle is increased by slight change of a drive frequency and a dropping phenomenon that a deflection angle is decreased by slight change of a drive frequency. The hysteresis phenomenon is a phenomenon that drive frequencies at which the jump phenomenon occurs are different between when a drive frequency is upswept and when a drive frequency is downswept. The scanner base body 100 exhibits the jump phenomenon at frequencies $f_A$ and $f_B$ (Points A and B in FIG. 1). Specifically, the scanner base body 100 exhibits the increase phenomenon at the frequency $f_A$ and the dropping phenomenon at the frequency $f_B$, respectively. In other words, the scanner base body 100 exhibits both the increase phenomenon and the dropping phenomenon. Hereinafter, a behavior of the deflection angle of the scanner base body 100 will be described in both the upsweep and the downsweep.

When a drive frequency is upswept from a frequency lower than the frequency $f_A$, a deflection angle increases as the drive frequency increases. When the drive frequency becomes the frequency $f_B$, the deflection angle becomes a maximum. When the drive frequency exceeds the frequency $f_B$, the deflection angle of the scanner base body 100 decreases, i.e., the dropping phenomenon occurs.

When the drive frequency is downswept from a frequency higher than the frequency $f_A$, the deflection angle increases as the drive frequency decreases. The deflection angle at the time when the drive frequency is downswept from a frequency higher than the frequency $f_A$ is smaller than the deflection angle at the time when the drive frequency is upswept from a frequency lower than the frequency $f_A$. When the drive frequency gradually approaches the frequency $f_A$, the deflection angle rapidly increases, i.e., the increase phenomenon occurs.

As mentioned above, in general, an optical scanner having a non-linear frequency characteristic can obtain a deflection angle larger than that of an optical scanner having a linear frequency characteristic at a predetermined drive voltage. In other words, in order to obtain a large deflection angle, the optical scanner having a non-linear frequency characteristic is suitable rather than the optical scanner having a linear frequency characteristic. Further, in order to obtain a maximum deflection angle in the optical scanner having a non-linear frequency characteristic, it is ideal to drive the scanner with a frequency just before the dropping phenomenon occurs, for example, with the frequency $f_B$ for the scanner base body 100. However, as described above, the resonance frequency of the optical scanner varies by the disturbances such as temperature change, secular change and the like. In other words, the frequencies $f_A$ and $f_B$ at which the jump phenomenon occurs also vary by the disturbances such as temperature change, secular change and the like. Accordingly, for performing a constant drive which realizes a large deflection angle and a stable drive against the disturbances, it is necessary to determine the frequency $f_B$ at which the dropping phenomenon occurs.

In illustrative embodiments, by using configurations described herein, a constant drive realizing a large deflection angle and a stable drive against disturbances can be performed.

Again referring to FIG. 2, the description of the functional block diagram of the optical scanner 10 will be continued. The light source LS provided at the outside of the optical scanner 10 illuminates the light to the deflection mirror 111 of the scanner base body 100. As the light source LS, a laser light source such as a semiconductor laser or a solid laser having harmonic producer can be used. Another light emitting device such as an LED may be used as the light source LS.

The beam detector 400 detects a deflection status of the deflection mirror 111. Specifically, the beam detector 400 is provided at a predetermined position on a trace through which the light from the light source LS scanned by the scanner base body 100 (hereinafter, referred to as scanning light) passes. In other words, the beam detector 400 is provided at a predetermined relative position to the scanner base body 100 so that it can receive the scanning light when the deflection angle of the deflection mirror 111 becomes a predetermined angle. The beam detector 400 having received the scanning light generates a deflection status signal. The generated deflection status signal is transmitted to the controller 200. The beam detector 400 may be configured by a photoelectric element (for example, photo diode) that generates electrons in accordance with received photons. Meanwhile, when the deflection mirror 111 is rotated to a predetermined angle or less, the scanning light is not incident on the beam detector 400. In this case, a deflection status signal is not generated and the deflection angle is considered as "0°" by the controller 200. In addition, the beam detector 400 is provided at a position where the scanning light is not incident when the dropping phenomenon occurs. In other words, the deflection angle after the deflection dropping phenomenon is considered as "0°" by the controller 200.

The controller 200 generates a drive signal for oscillating the scanner base body 100 with a predetermined drive frequency and transmits the drive signal to the drive units 300 through the superimposition circuit 600. In addition, the controller 200 can determine a target drive frequency, which is a drive frequency for stably driving the scanner base body 100, by referring to the deflection status signal from the beam detector 400. The controller 200 includes a drive frequency determination unit 201, a frequency change controller 202, a drive signal generator 203, a deflection angle determination unit 204, a deflection angle memory 205, a deflection angle comparator 206, a jump phenomenon judging unit 207, a phase difference determination unit 208 and a target phase difference memory 209. In the meantime, the above components constituting the controller 200 may be constituted by a microcomputer including CPU, ROM, RAM and the like, a FPGA, ASIC and the like, for example. Hereinafter, the constitutional components of the controller 200 will be described.

The drive frequency determination unit 201 determines a drive frequency of the drive signal to be transmitted from the controller 200 to the drive units 300 through the superimposition circuit 600. Specifically, the drive frequency determination unit 201 determines a frequency value of the drive frequency and a way of changing the drive frequency into the frequency value. The way of changing the drive frequency includes a stepwise change of the frequency value, a change of the frequency value at once from a current frequency value to a target frequency value, change in a frequency interval for the stepwise change, and the like. The drive frequency determination unit 201 also determines a target drive frequency, which is a frequency at which the scanner base body 100 is constantly driven, based on a drive frequency at which the jump phenomenon judging unit 207 judges whether a jump phenomenon occurs. The drive frequency determination unit 201 is configured to transmit the determined drive frequency to the frequency change controller 202 as a frequency determination signal.

The frequency change controller 202 determines a frequency value of the drive frequency in accordance with the frequency determination signal from the drive frequency determination unit 201. The frequency change controller 202 is configured to transmit the determined frequency value to the drive signal generator 203 as a frequency change signal. In addition, the frequency change controller 202 is configured to temporarily memorize a frequency value of a current drive frequency, a frequency interval for stepwise change, and the like.

The drive signal generator 203 generates a drive signal in accordance with the frequency change signal from the frequency change controller 202. The drive signal generator 203 is configured to transmit the generated drive signal to the phase difference determination unit 208, the superimposition circuit 600 and the DC power circuit 500. The drive signal is a sinusoidal wave that is defined by an amplitude and a frequency, for example.

The deflection angle determination unit 204 determines a deflection angle of the deflection mirror 111 based on the deflection status signal from the beam detector 400. The deflection angle is a value that an amplitude of the deflection minor 111 being oscillated is represented as an angle. As described above, the beam detector 400 receives the scanning light when the deflection angle reaches a predetermined angle. The timing at which the beam detector 400 receives the scanning light is included in the deflection status signal. The deflection angle determination unit 204 determines a deflection angle based on the timing at which the scanning light is received and the relative position of the beam detector 400 to the scanner base body 100. The deflection angle determination unit 204 is configured to transmit the determined deflection angle to the deflection angle memory 205 and the deflection angle comparator 206, as a deflection angle signal.

The deflection angle memory 205 temporarily memorizes the deflection angle determined by the deflection angle determination unit 204, which is included in the received deflection angle signal, and the frequency value of the drive frequency while being associated with the deflection angle for the drive frequency. The deflection angle memory 205 is configured to transmit the memorized deflection angle and frequency value to the deflection angle comparator 206, as a deflection angle memorizing signal in response to a request from the deflection angle comparator 206.

The deflection angle comparator 206 compares the deflection angle signal with the deflection angle memorizing signal. Specifically, the deflection angle comparator 206 transmits a request to the deflection angle memory 205 to obtain a deflection angle at a desired drive frequency. Then, the deflection angle comparator 206 calculates a difference between the deflection angle included in the deflection angle memorizing signal from the deflection angle memory 205 and the deflection angle included in the deflection angle signal from the deflection angle determination unit 204. The deflection angle comparator 206 is configured to transmit a value of the difference to the jump phenomenon judging unit 207, as a deflection angle comparison signal.

The jump phenomenon judging unit 207 judges whether a jump phenomenon, particularly a dropping phenomenon occurs, based on the deflection angle comparison signal from the deflection angle comparator 206. The jump phenomenon judging unit 207 is configured to transmit a result of the determination to the drive frequency determination unit 201 and the frequency change controller 202, as a jump judgment signal.

The phase difference determination unit 208 determines a phase difference between a phase of the drive signal and a phase of the deflection angle of the deflection mirror 111 based on the deflection status signal from the beam detector 400 and the drive signal from the drive signal generator 203. The phase difference determination unit 208 is configured to transmit the determined phase difference to the drive frequency determination unit 201 and the target phase difference memory 209, as a phase difference signal.

The target phase difference memory 209 memorizes the phase difference determined by the phase difference determination unit 208, as a target phase difference. The target phase difference memory 209 is configured to transmit the memorized target phase difference to the phase difference determination unit 208, as a target phase difference signal, in response to a request from the phase difference determination unit 208.

The DC power circuit 500 generates DC voltage that is superimposed with a drive signal. A value of the DC voltage generated is adjusted in accordance with the drive signal so that a minimum value of voltage in the drive signal becomes 0V or more. The voltage to be applied to the drive units 300 is always 0V or more, so that the polarization states of the piezoelectric elements 320 included in the drive units 300 are always maintained to be one direction. As a result, it is possible to prevent the characteristic of the piezoelectric elements 320 from being deteriorated. The DC voltage generated is applied to the superimposition circuit 600.

The superimposition circuit 600 is configured to superimpose the drive signal from the controller 200 and the DC voltage from the DC power circuit 500. The drive signal having the DC voltage superimposed thereto is transmitted to the drive units 300.

[Drive Control of Optical Scanner 10]

Figure 4:
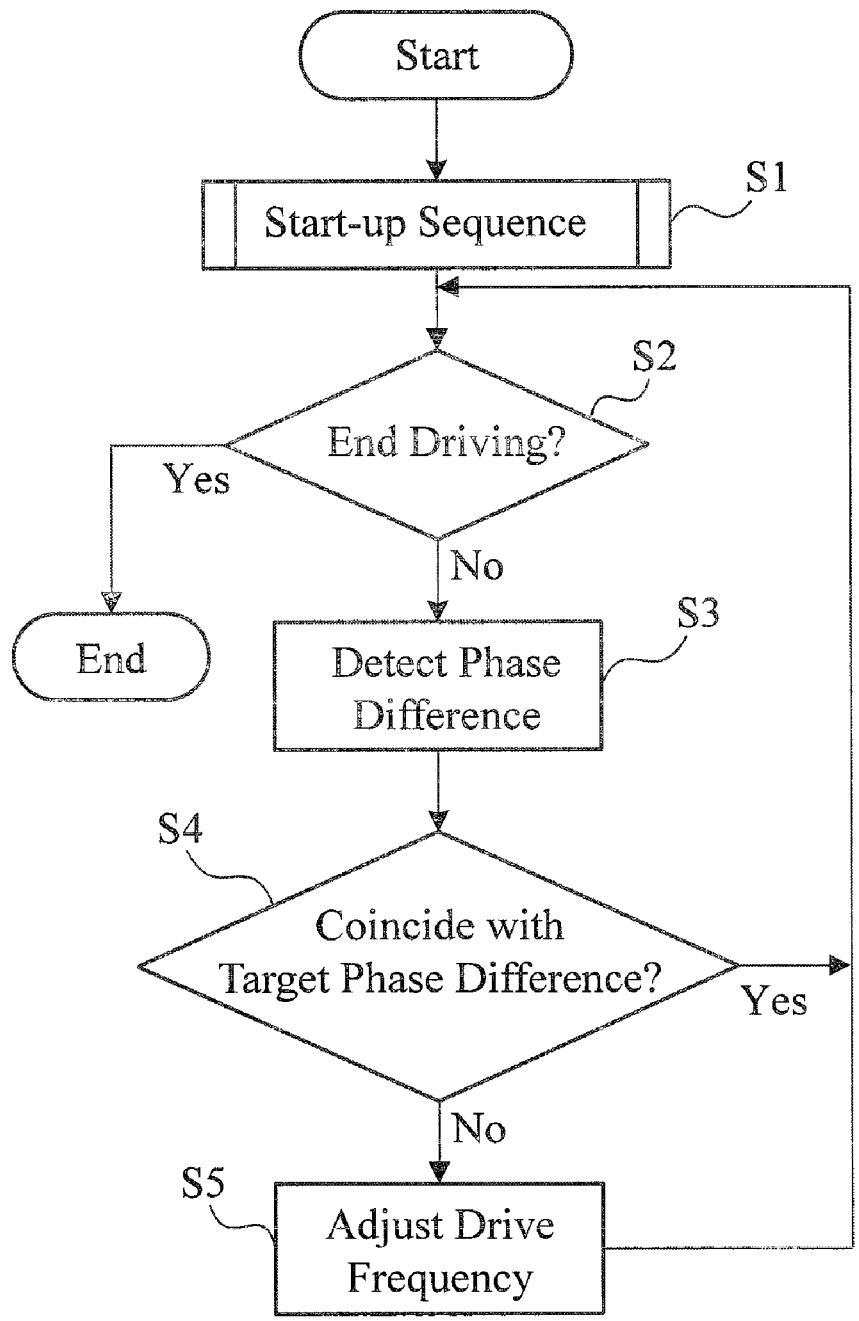
FIG. 4 is a flow chart showing a drive control process of the optical scanner 10 by a controller 200.

A drive control process shown in FIG. 4 is started when power is supplied to the optical scanner 10 from the outside and the optical scanner 10 is thus operated. Hereinafter, the drive control process of the optical scanner 10 will be described with reference to FIG. 4.

As shown in FIG. 1, the scanner base body 100 has a non-linear frequency characteristic. In order to obtain a large deflection angle, it is ideal that the scanner base body 100 is operated with the frequency $f_B$. However, as described above, the frequency $f_B$ at which the dropping phenomenon occurs varies by the disturbances such as temperature change, secular change and the like. In order to appropriately perform a constant drive, it is necessary to determine a target drive frequency for the constant drive. Accordingly, the controller 200 executes a start-up sequence for determining a target drive frequency in step S1. Hereinafter, the start-up sequence will be described with reference to FIG. 5.

In step SA1, the drive frequency determination unit 201 generates a frequency determination signal that sets the drive frequency to a search start frequency lower than the point A (frequency $f_A$) of FIG. 1. As the search start frequency, for example, a frequency that is lower than the frequency $f_A$ by 100 Hz is adopted. Here, the frequency $f_A$ at the point A of FIG. 1 is an existing frequency value that has been previously memorized in the drive frequency determination unit 201. The frequency $f_A$ is obtained by measuring the deflection angle while sweeping the drive frequency under predetermined temperature circumstances at the time of factory shipment, for example. Of course, the frequency $f_A$ can be also obtained by any method such as simulation using design values of the scanner base body 100. The drive frequency determination unit 201 transmits the generated frequency determination signal to the frequency change controller 202. The frequency change controller 202 generates a frequency change signal for changing the drive frequency of the drive signal to the search start frequency in accordance with the received frequency determination signal. The generated frequency change signal is transmitted to the drive signal generator 203. The frequency change controller 202 temporarily memorizes the search start frequency as a current drive frequency. The drive signal generator 203 generates a drive signal in accordance with the received frequency change signal. The generated drive signal is applied, as a drive signal having DC voltage superimposed thereto, to the drive units 300 through the DC power circuit 500 and the superimposition circuit 600. Then, the process proceeds to step SA2.

It is noted that the search start frequency is changed depending on temperature circumstances of the scanner base body 100. Experimentally, it is found that there is a difference of about 100 Hz in the search start frequency under 0° C. and 50° C. In other words, a frequency lower than the frequency $f_A$ by 100 Hz is an example of the search start frequency that is determined while considering the changes of the search start frequency due to the disturbances such as temperature change. For example, when more stable start is expected, it may be possible that frequencies lower than the frequency $f_A$ by 200, 300 and 400 Hz are adopted as the search start frequency. Alternatively, when the scanner base body 100 is used under circumstances having little temperature change, it may be possible that frequencies lower than the frequency $f_A$ by 10, 20 and 40 Hz are adopted as the search start frequency for speed-up of the start-up sequence.

In step SA2, the drive frequency determination unit 201 generates a frequency determination signal that sets a frequency incremental step to 1 Hz for upsweeping the drive frequency. Then, the drive frequency determination unit 201 transmits the generated frequency determination signal to the frequency change controller 202. The frequency change controller 202 temporarily memorizes the frequency incremental step (i.e., 1 Hz) included in the frequency determination signal. After that, the process proceeds to step SA3. The frequency incremental step may be arbitrary, instead of 1 Hz. For example, when it is desired to shorten the time required for the start-up sequence process, the frequency incremental step may be a value higher than 1 Hz (for example, 2 Hz, 5 Hz, 10 Hz and the like). When it is desired to precisely detect a frequency at which the dropping phenomenon occurs, the frequency incremental step may be a value lower than 1 Hz (for example, 0.5 Hz, 0.2 Hz, 0.1 Hz and the like).

In step SA3, the frequency change controller 202 increments the drive frequency in accordance with the frequency incremental step that is temporarily memorized therein. Specifically, the frequency change controller 202 generates a frequency change signal for changing the drive frequency to a frequency having incremented by 1 Hz from the current drive frequency. The frequency change controller 202 transmits the generated frequency change signal to the drive signal generator 203. The frequency change controller 202 overwrites a new value of the drive frequency to the current drive frequency. The drive signal generator 203 having received the frequency change signal applies the drive signal having DC voltage superimposed thereto to the drive units 300 through the DC power circuit 500 and the superimposition circuit 600. After that, the process proceeds to step SA4.

The Q value of the scanner base body 100 is set to be relatively high (for example about $10^3$) so as to obtain a large deflection angle. Therefore, it takes time for the frequency of oscillating the scanner base body 100 to follow the drive frequency of the new drive signal. Thus, in step SA4, the controller 200 waits for a predetermined time period. Specifically, the frequency change controller 202 continues to transmit a frequency change signal which causes a drive signal by the current drive frequency temporarily memorized therein, to the drive signal generator 203 for the predetermined time period. In other words, the drive frequency is maintained constant for the predetermined time period. After that, the process proceeds to step SA5. It is noted that the predetermined time period may be 20 ms, for example. However, if it is sufficient for the drive frequency of oscillating the scanner base body 100 to follow a drive frequency of a new drive signal, the wait time may be arbitrary. Therefore, the wait time may be changed in accordance with the Q value of the scanner base body that is used in the optical scanner. For example, when a scanner base body having a Q value higher than that of the scanner base body 100 is used, the wait time may be time longer than 20 ms (for example, 40 ms, 100 ms, 200 ms and the like). In contrast, when a scanner base body having a Q value lower than that of the scanner base body 100 is used, the wait time may be time shorter than 20 ms (for example, 10 ms, 5 ms, 2 ms and the like).

In step SA5, the deflection angle determination unit 204 determines a deflection angle of the deflection mirror 111 based on the deflection status signal from the beam detector 400. The deflection angle determination unit 204 transmits the determined deflection angle to the deflection angle memory 205 and the deflection angle comparator 206, as a deflection angle signal. Then, the process proceeds to step SA6.

In step SA6, the deflection angle memory 205 temporarily memorizes the deflection angle included in the received deflection angle signal and the current drive frequency while being associated with each other. Then, the process proceeds to step SA7.

In step SA7, the deflection angle comparator 206 transmits a request to the deflection angle memory 205 and obtains a deflection angle in a last loop, i.e., a deflection angle at a drive frequency that is lower than the current drive frequency by 1 Hz. Then, the deflection angle comparator 206 compares the obtained deflection angle in a last loop with the current deflection angle included in the deflection angle signal from the deflection angle determination unit 204. The comparison is made by subtracting the deflection angle in a last loop from the current deflection angle. The deflection angle comparator 206 transmits a difference between the current deflection angle and the deflection angle in a last loop (hereinafter, referred to as deflection angle difference) to the jump phenomenon judging unit 207, as a deflection angle comparison signal. Herein, when there is no last loop, i.e., when there is nothing temporarily memorized in the deflection angle memory 205, the deflection angle comparator 206 transmits a deflection angle comparison signal indicating that the comparison is not made to the jump phenomenon judging unit 207. Then, the process proceeds to step SA8.

In step SA8, the jump phenomenon judging unit 207 determines whether a maximum deflection angle is detected based on the deflection angle comparison signal from the deflection angle comparator 206. Specifically, the jump phenomenon judging unit 207 determines whether the current deflection angle is decreased as compared to the deflection angle in a last loop. When the deflection angle difference is minus, the jump phenomenon judging unit 207 determines that a maximum deflection angle is detected (positive). In contrast, when the deflection angle difference is plus or when the comparison of the deflection angles is not made due to no last loop, the jump phenomenon judging unit 207 determines that a maximum deflection angle is not detected (negative). When a result of the determination is positive (Yes), the process proceeds to step SA9. When a result of the determination is negative (No), the process returns to step SA3 and starts a next loop. The loop of step SA3 to step SA8 is repeated, so that the drive frequency is upswept.

In step SA9, the jump phenomenon judging unit 207 judges whether a decrease of the deflection angle after the maximum deflection angle is detected indicates (corresponds to) that the dropping phenomenon occurs. The process of judging whether the dropping phenomenon occurs is made based on the deflection angle. Hereinafter, the reason will be described with reference to FIGS. 6A and 6B.

Figure 6A:
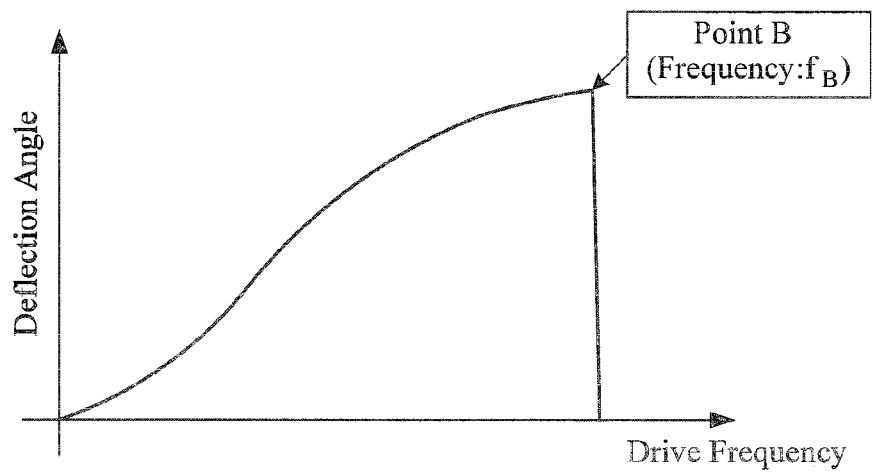
FIG. 6A is a diagram illustrating a frequency characteristic when a peak deflection angle exists.
Figure 6B:
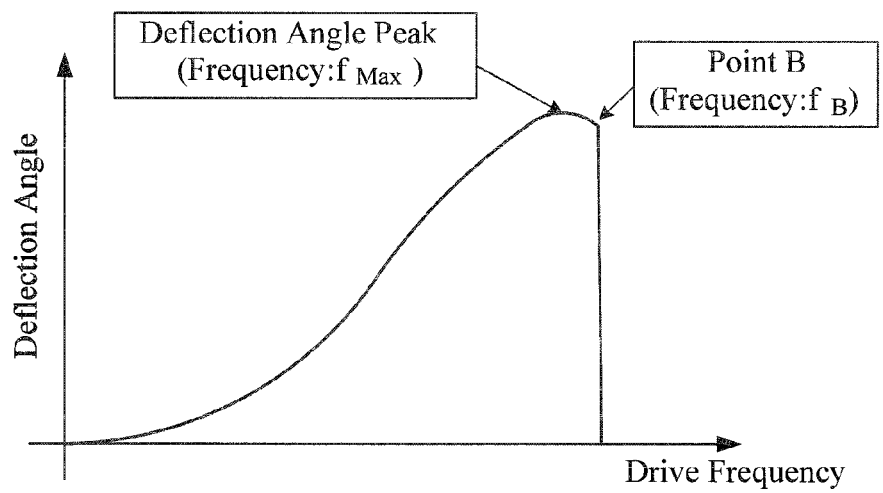
FIG. 6B is a diagram illustrating a frequency characteristic when a peak deflection angle does not exist.

In FIGS. 6A and 6B, the horizontal axis indicates the drive frequency and the vertical axis indicates the deflection angle. Curves in FIGS. 6A and 6B indicate the frequency characteristic for the upsweep in FIG. 1. As shown in FIG. 6A, for a scanner base body having no peak deflection angle, when the drive frequency is lower than the drive frequency at a point B (frequency $f_B$) at which the dropping phenomenon occurs, the deflection angle increases as the drive frequency increases. When the drive frequency exceeds the point B, the dropping phenomenon occurs. In contrast, a scanner base body has a peak deflection angle, as shown in FIG. 6B. In FIG. 6B, when the drive frequency is lower than a drive frequency at a peak deflection angle (frequency $f_{MAX}$), the deflection angle increases as the drive frequency increases. When the drive frequency exceeds the peak position, the deflection angle gently decreases as the drive frequency increases. The gentle decrease of the deflection angle continues until the drive frequency reaches the point B. When the drive frequency exceeds the point B, the dropping phenomenon occurs.

Figure 5A:
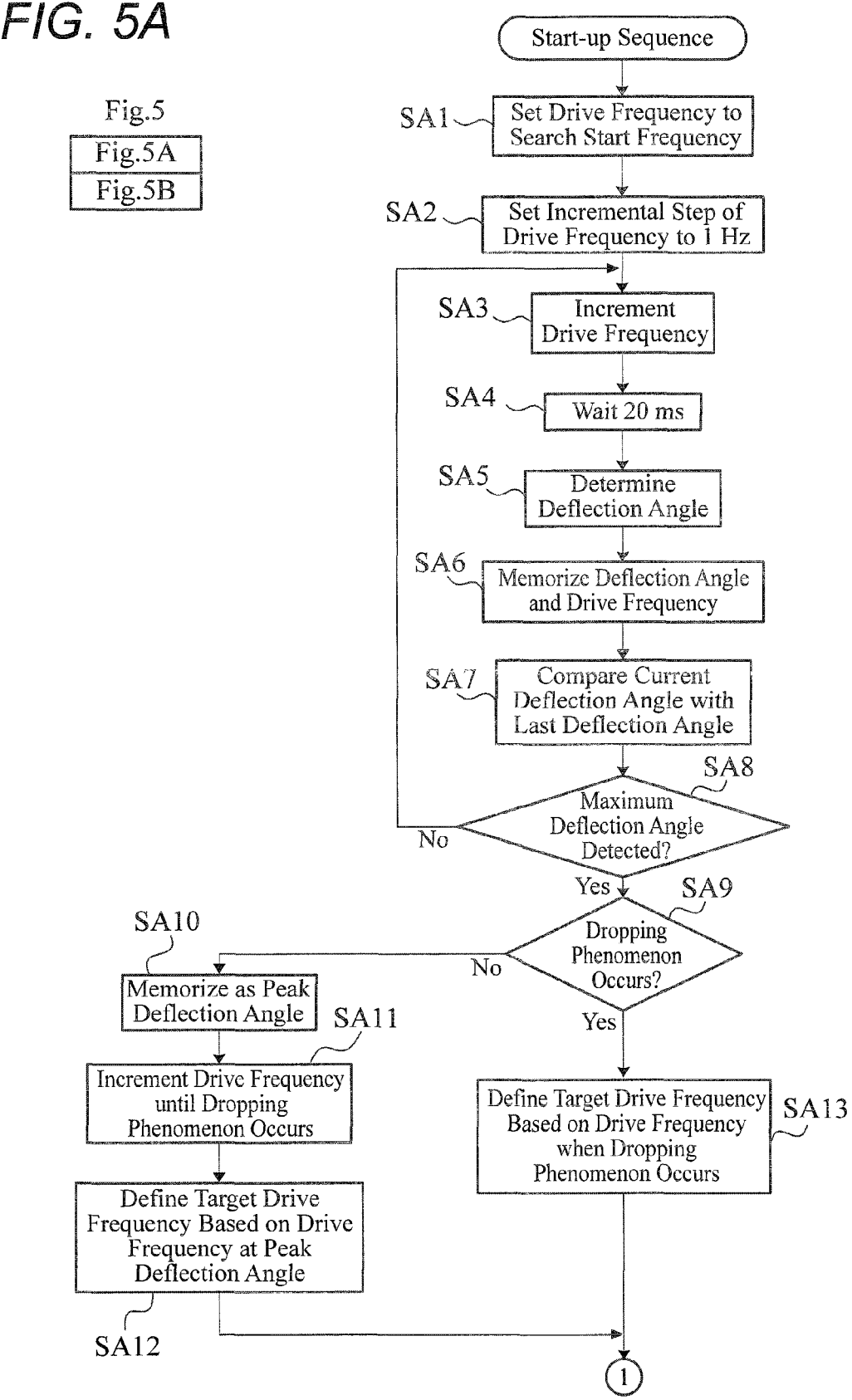
FIGS. 5 (5A and 5B) is a flow chart showing a start-up sequence of the optical scanner by the controller 200.
Figure 5B:
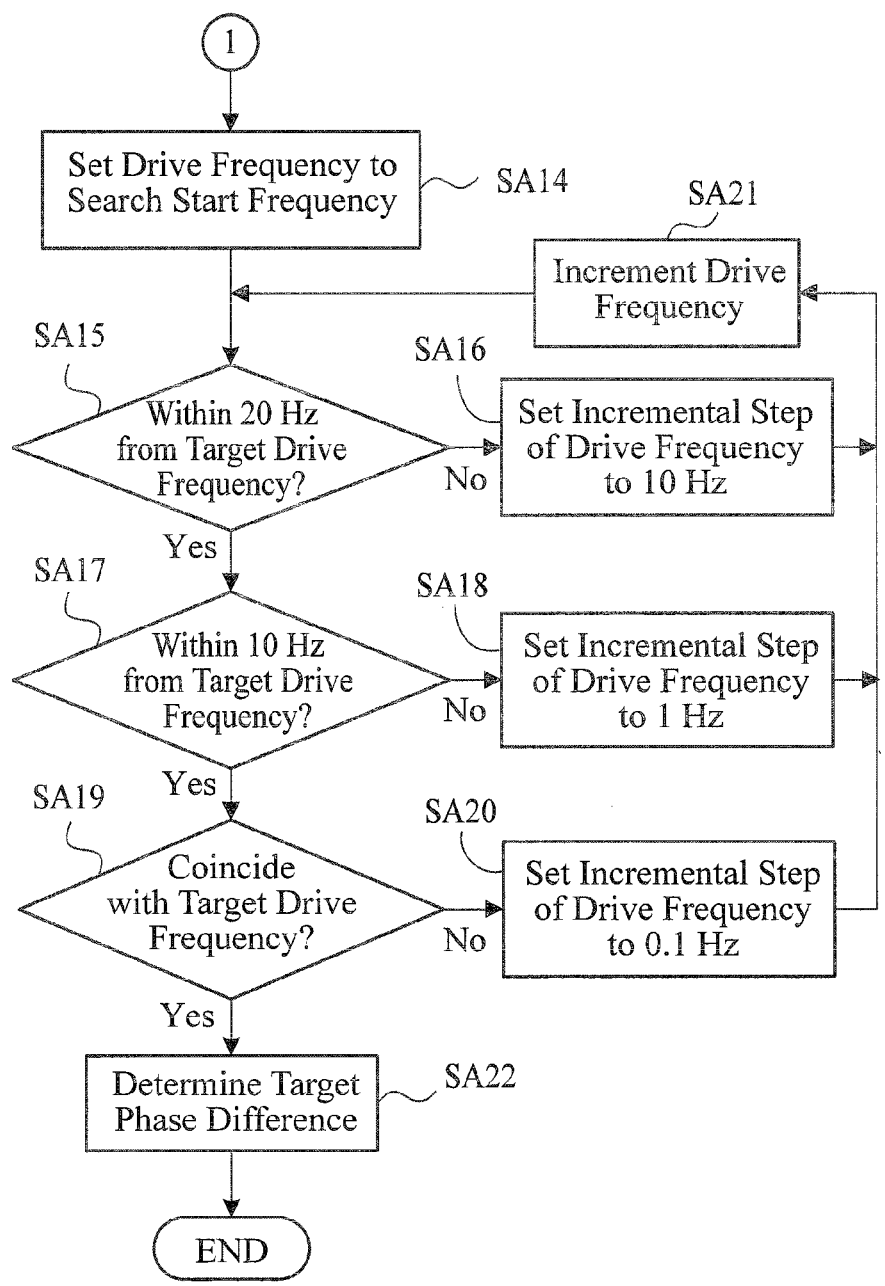

Back to FIG. 5, step SA9 will be continuously described. The jump phenomenon judging unit 207 increments the drive frequency in accordance with the frequency incremental step through the frequency change controller 202. The jump phenomenon judging unit 207 determines whether the decrease of the deflection angle continues ten times based on the deflection angle comparison signal from the deflection angle comparator 206. When the decrease of the deflection angle continues ten times, the jump phenomenon judging unit 207 transmits a jump determination signal indicating a determination that the dropping phenomenon does not occur to the drive frequency determination unit 201. In contrast, if the dropping phenomenon occurs, the scanning light is not incident on the beam detector 400. Accordingly, the deflection angle is considered "0°." In other words, after the dropping phenomenon occurs, the detected deflection angle is considered "0°." Accordingly, the deflection angle difference is also 0°. When the decrease of the deflection angle does not continue ten times, i.e., when the deflection angle difference is continuously kept 0°, the jump phenomenon judging unit 207 transmits a jump determination signal indicating a determination that the dropping phenomenon occurs to the drive frequency determination unit 201. When a result of the determination in step SA9 is positive (Yes), the process proceeds to SA13. In contrast, when a result of the determination in step SA9 is negative (No), the process proceeds to SA10. In the meantime, it may be possible to determine whether the dropping phenomenon occurs based on a phase difference, a timing of receiving a deflection status signal and the like, instead of the deflection angle of the deflection mirror 111.

In step SA10, the jump phenomenon judging unit 207 temporarily memorizes the maximum deflection angle detected in step SA8, as a peak deflection angle. The jump phenomenon judging unit 207 also temporarily memorizes a drive frequency at which the maximum deflection angle is detected and the peak deflection angle while being associated with each other. The temporarily memorized peak deflection angle and the drive frequency at which the peak deflection angle is detected are transmitted to the drive frequency determination unit 201 from the jump phenomenon judging unit 207 and are temporarily memorized in the drive frequency determination unit 201. After that, the process proceeds to step SA11.

In step SA11, the jump phenomenon judging unit 207 further increments the drive frequency in accordance with the frequency incremental step, through the frequency change controller 202. The increment of the drive frequency is continued until the dropping phenomenon occurs, i.e., the deflection angle difference reaches 0°. After the jump judgment signal indicating the determination that the jump phenomenon occurs is transmitted to the drive frequency determination unit 201 from the jump phenomenon judging unit 207, the process proceeds to step SA12.

In step SA12, the drive frequency determination unit 201 determines, as a target drive frequency, a drive frequency that is lower than the drive frequency at which the peak deflection angle is detected by a predetermined value. The predetermined value is set to have a sufficient margin with regard to the inconstancy of the drive frequency at which the peak deflection angle is detected and the frequency change due to the disturbances such as temperature change and secular change. For example, a drive frequency lower than the drive frequency at which the peak deflection angle is detected by 10 Hz is determined as a target drive frequency. The drive frequency determination unit 201 temporarily memorizes the determined target drive frequency. After that, the process proceeds to step SA14. It is noted that a frequency which is lower than the drive frequency at which the peak deflection angel is detected by 5 Hz, 20 Hz, 40 Hz, 100 Hz and the like may be adopted as the target drive frequency as long as the target drive frequency is a frequency low enough for the frequency change due to the disturbances such as temperature change and secular change.

In step SA13, the drive frequency determination unit 201 determines, as a target drive frequency, a drive frequency that is lower than the drive frequency at which the dropping phenomenon is determined to occur by a predetermined value. The predetermined value is set to have a sufficient margin with regard to the inconstancy of the drive frequency at which the dropping phenomenon due to the disturbances such as temperature change and secular change is detected. For example, a drive frequency lower than the drive frequency at which the dropping phenomenon is detected by 10 Hz is determined as a target drive frequency. The drive frequency determination unit 201 temporarily memorizes the determined target drive frequency. After that, the process proceeds to step SA14. It is noted that like step SA12, a frequency lower than the drive frequency at which the dropping phenomenon is detected by 5 Hz, 20 Hz, 40 Hz, 100 Hz and the like may be adopted as the target drive frequency.

In step SA14, the drive frequency determination unit 201 re-sets the current drive frequency to the search start frequency. Specifically, as described in step SA1, the drive frequency determination unit 201, the frequency change controller 202 and the drive signal generator 203 cooperate with one another, so that the process of step SA14 is performed. After that, the process proceeds to step SA15. It is noted that the current frequency may be set as a frequency different from the search start frequency as long as the drive frequency is lower than the frequency $f_A$.

In step SA15, the drive frequency determination unit 201 determines whether the current drive frequency is within 20 Hz from the target drive frequency that is temporarily memorized therein. When a result of the determination in step SA15 is positive (Yes), the process proceeds to step SA17. When a result of the determination in step SA15 is negative (No), the process proceeds to step SA16.

In step SA16, the drive frequency determination unit 201 generates a frequency determination signal that sets a frequency incremental step to 10 Hz for upsweeping the drive frequency. Then, the drive frequency determination unit 201 transmits the generated frequency determination signal to the frequency change controller 202. The frequency change controller 202 temporarily memorizes the frequency incremental step (i.e., 10 Hz) included in the frequency determination signal. After that, the process proceeds to step SA21.

In step SA17, the drive frequency determination unit 201 determines whether the current drive frequency is within 10 Hz of the target drive frequency that is temporarily memorized therein. When a result of the determination in step SA17 is positive (Yes), the process proceeds to step SA19. When a result of the determination in step SA17 is negative (No), the process proceeds to step SA18.

In step SA18, the drive frequency determination unit 201 generates a frequency determination signal that sets a frequency incremental step to 1 Hz for upsweeping the drive frequency. Then, the drive frequency determination unit 201 transmits the generated frequency determination signal to the frequency change controller 202. The frequency change controller 202 temporarily memorizes the frequency incremental step (i.e., 1 Hz) included in the frequency determination signal. After that, the process proceeds to step SA21.

In step SA19, the drive frequency determination unit 201 determines whether the current drive frequency coincides with the target drive frequency that is temporarily memorized therein. Herein, the coincidence may include a case where both frequencies are not completely same. For example, when the current drive frequency is within ±0.1 Hz from the target drive frequency, it may be considered that both frequencies coincide with each other. When a result of the determination in step SA19 is positive (Yes), the process proceeds to step SA22. When a result of the determination in step SA19 is negative (No), the process proceeds to step SA20.

In step SA20, the drive frequency determination unit 201 generates a frequency determination signal that sets the frequency incremental step to 0.1 Hz for upsweeping the drive frequency. Then, the drive frequency determination unit 201 transmits the generated frequency determination signal to the frequency change controller 202. The frequency change controller 202 temporarily memorizes the frequency incremental step (i.e., 0.1 Hz) included in the frequency determination signal. After that, the process proceeds to step SA21.

In step SA21, the frequency change controller 202 generates a frequency change signal for changing the drive frequency to a frequency that is obtained by adding the frequency incremental step (i.e., one of 10 Hz, 1 Hz, and 0.1 Hz), which is temporarily memorized therein, to the current drive frequency. The frequency change controller 202 transmits the generated frequency change signal to the drive signal generator 203. The frequency change controller 202 overwrites the new drive frequency onto the current drive frequency. The drive signal generator 203 having received the frequency change signal applies the drive signal having DC voltage superimposed thereto to the drive units 300 through the DC power circuit 500 and the superimposition circuit 600. After that, the process proceeds to step SA15.

As described above, the current drive frequency is re-set to the search start frequency through the process of step SA14 and the processes of step SA15 to step SA21 are repeated, so that the drive frequency is again upswept.

In step SA22, the phase difference determination unit 208 determines a phase difference at the time when the scanner base body 100 is driven by the target drive frequency (hereinafter, referred to as target phase difference). Here, the target phase difference will be described with reference to FIG. 7. In FIG. 7, the horizontal axis indicates the drive frequency and the vertical axis indicates the phase difference. In FIG. 7, phase differences for drive frequencies when the drive frequencies are upswept are with filled squares and a solid line.

In FIG. 7, phase differences for drive frequencies when the drive frequencies are downswept are with filled triangles and a dotted line.

Since the scanner base body 100 has a non-linear frequency characteristic, the phase difference is not uniquely determined for the drive frequency. As shown in FIG. 7, when the drive frequency is upswept from a frequency lower than the frequency $f_A$, the phase difference increases as the drive frequency increases. The phase difference is rapidly increased at the point B at which the dropping phenomenon occurs. When the drive frequency is downswept from a frequency higher than the frequency $f_A$, the phase difference increases as the drive frequency decreases. However, the phase difference at the time when the drive frequency is downswept from a frequency higher than the frequency $f_A$ is larger than the phase difference at the time when the drive frequency is upswept from a frequency lower than the frequency $f_A$. The phase difference is rapidly decreased at the point A at which the increase phenomenon occurs.

The phase difference determination unit 208 compares the deflection status signal from the beam detector 400 with the drive signal from the drive signal generator 203 to determine a phase difference at the target drive frequency. The phase difference determination unit 208 transmits the determined phase difference to the target phase difference memory 209, as a phase difference signal. The target phase difference memory 209 temporarily memorizes the phase difference, which is included in the phase difference signal, as a target phase difference. Then, the controller 200 ends the operations of start-up sequences and returns to step S2 in FIG. 4.

In step S2, the controller 200 determines whether to end the operations of drive control processes. The controller 200 performs the determination by determining whether to receive a signal to end driving the optical scanner 10 from the outside, for example. When a result of the determination in step S2 is positive (Yes), the controller 200 ends the operations of drive control processes. When a result of the determination in step S2 is negative (No), the process proceeds to step S3.

In step S3, the phase difference determination unit 208 compares the deflection status signal from the beam detector 400 with the drive signal from the drive signal generator 203 to determine a phase difference at the current drive frequency. The phase difference determination unit 208 transmits the determined phase difference to the drive frequency determination unit 201 as a phase difference signal. Then, the process proceeds to step S4.

In step S4, the drive frequency determination unit 201 determines whether the current phase difference coincides with the target phase difference. Specifically, the drive frequency determination unit 201 obtains the target phase difference, which is temporarily memorized in the target phase difference memory 209, through the phase difference determination unit 208. Then, the drive frequency determination unit 201 determines whether the current phase difference included in the phase difference signal received in step S3 coincides with the target phase difference. Herein, the coincidence may include a case where both phase differences are not completely same. For example, when the current phase difference is within ±0.1° from the target phase difference, it may be considered that both phase differences coincide with each other. When a result of the determination in step S4 is positive (Yes), the process returns to step S2. When a result of the determination in step S4 is negative (No), the process proceeds to step S5.

In step S5, the drive frequency determination unit 201 determines a drive frequency so that the current phase difference coincides with the target phase difference. Specifically, when the current phase difference is larger than the target phase difference, the drive frequency determination unit 201 determines to decrease the drive frequency. In contrast, when the current phase difference is smaller than the target phase difference, the drive frequency determination unit 201 determines to increase the drive frequency. The drive frequency determination unit 201 transmits a result of the determination to the frequency change controller 202, as a frequency determination signal. The frequency change controller 202 changes the frequency value of the drive signal through the drive signal generator 203. Then, the process returns to step S2.

As described above, the operations of step S3 to step S5 are repeated, so that it is possible to drive the optical scanner 10 based on the deflection status signal from the beam detector 400. Even when the resonance frequency of the scanner base body is changed due to the disturbances such as temperature change or secular change, the target phase difference is not changed so much. Therefore, the drive frequency is adjusted so that the phase difference coincides with the target phase difference. As a result, it is possible to keep the stable driving.

Another Illustrative Embodiment

Figure 8:
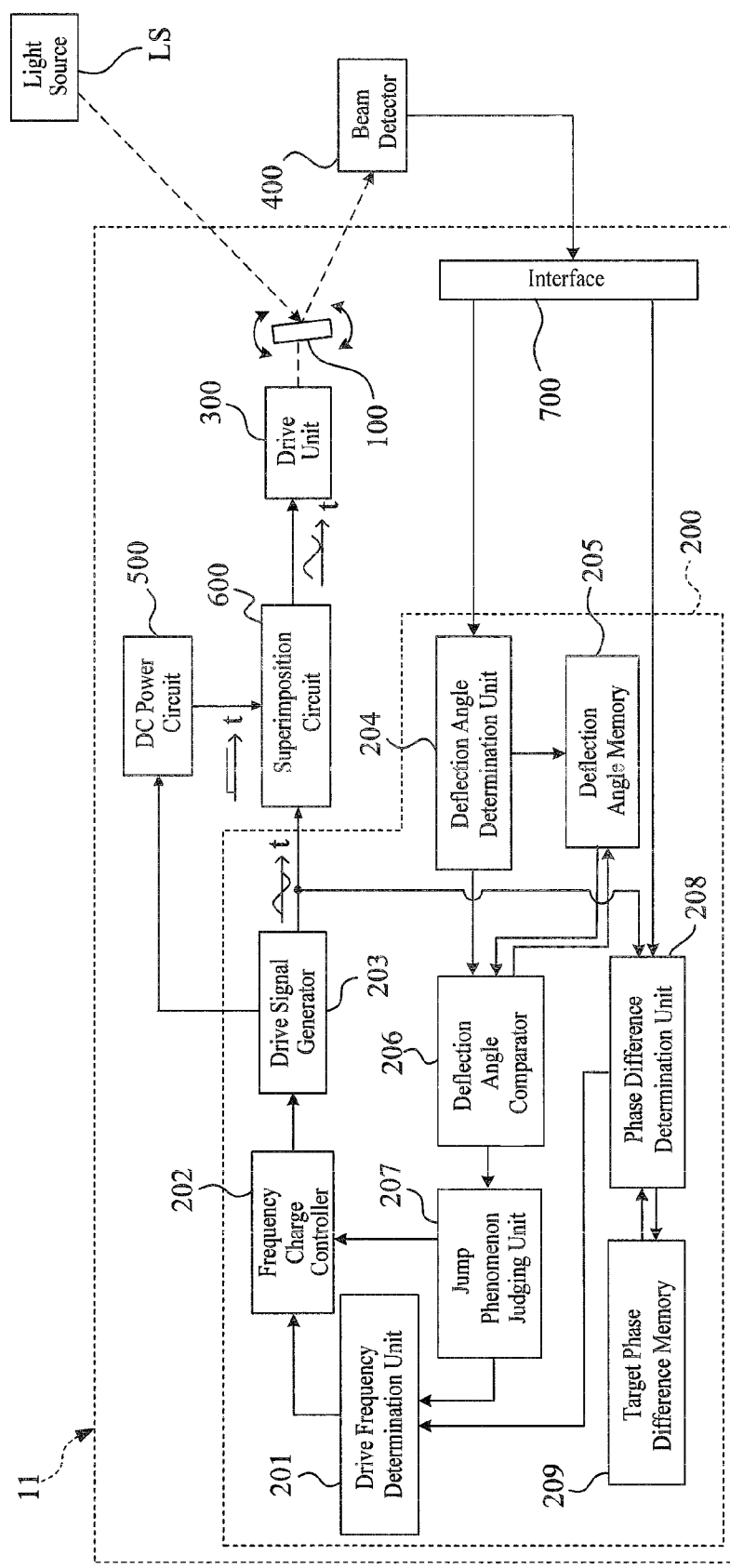
FIG. 8 is a functional block diagram of an optical scanner 11.

In this illustrative embodiment as shown in FIG. 8, an optical scanner 11 is different from the optical scanner 10 of the above-described illustrative embodiment in that (1) the optical scanner 11 includes an interface 700 and that (2) the beam detector 400 is provided at the outside of the optical scanner 11. The constitutional components of the optical scanner 11 common to those of the optical scanner 10 are indicated by the reference numerals same as those in FIG. 2 and the descriptions thereof will be omitted.

The interface 700 receives a deflection status signal from the beam detector 400. The interface 700 is configured to transmit the received deflection status signal to the deflection angel determination unit 204 and the phase difference determination unit 208, as a transfer signal. In other words, the interface 700 has a configuration of obtaining the deflection status of the deflection mirror 111. The interface 700 may be configured as, for example, a conversion circuit that converts a signal format from the beam detector 400, a socket that is electrically connected to a wiring from the beam detector, a wiring that extends from the optical scanner 11 to the beam detector 400, and the like.

The driving control process of the optical scanner 11 that is performed by the controller 200 is almost same as the driving control process of the optical scanner 10 in the above-described illustrative embodiment (refer to FIGS. 4 and 5). However, the controller 200 directly receives the deflection status signal from the beam detector 400 (step S3, step SA5) in the above-described illustrative embodiment, whereas the controller 200 receives the deflection status signal from the beam detector 400 through the interface 700 in this illustrative embodiment.

Another Illustrative Embodiment

Figure 9:
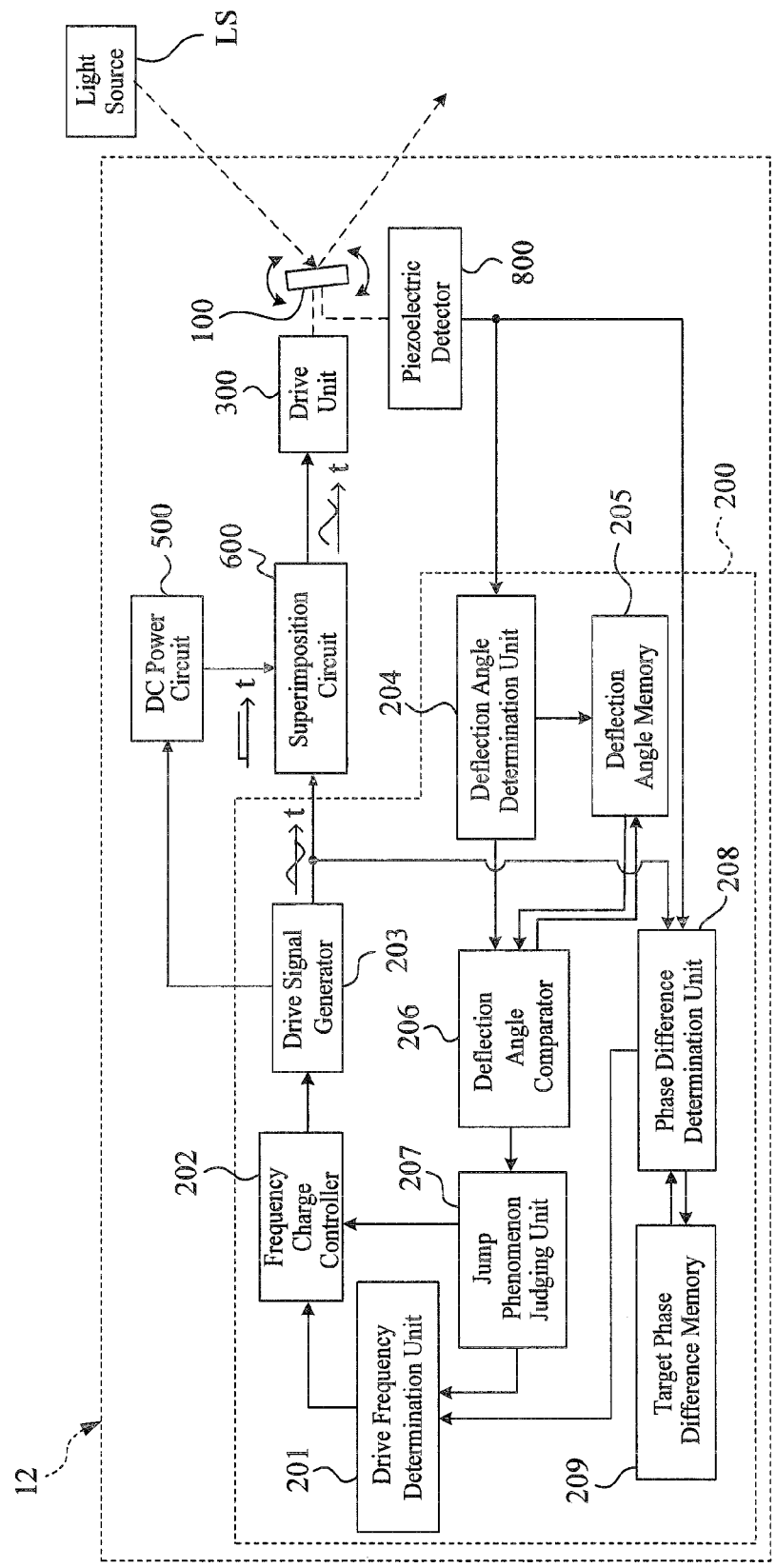
FIG. 9 is a functional block diagram of an optical scanner 12.

In this illustrative embodiment as shown in FIG. 9, an optical scanner 12 is different from the optical scanner 10 of the above-described illustrative embodiment, in that (1) the optical scanner 12 includes an piezoelectric detector 800 and that (2) there is no beam detector 400. The constitutional components of the optical scanner 12 common to those of the optical scanner 10 are indicated by the reference numerals same as those in FIG. 2 and the descriptions thereof will be omitted.

The piezoelectric detector 800 detects a deflection status of the deflection mirror 111. The piezoelectric detector 800 is provided above the pair of beam parts 112c so as to detect the flexural displacement of the beam parts 112c. Specifically, one of the drive units 300 provided both at the front support beam 112 and the inner support beam 112 of the scanner base body 100 in FIG. 3 is used as the piezoelectric detector 800. The piezoelectric detector 800 is flexurally displaced while following the flexural displacement of the pair of beam parts 112c. Accordingly, the piezoelectric detector is polarized in a thickness direction of the scanner base body 100 by the piezoelectric effect. As a result, a voltage difference resulting from the flexural displacement of the piezoelectric detector 800 is caused between the lower electrodes and the upper electrodes. The piezoelectric detector 800 reads out the voltage difference as a deflection status signal, so that it obtains the deflection status of the deflection mirror 111.

The driving control process of the optical scanner 12 that is performed by the controller 200 is almost same as the driving control process of the optical scanner 10 in the above-described illustrative embodiment (refer to FIGS. 4 and 5). However, the controller 200 receives the deflection status signal from the beam detector 400 (step S3, step SA5) in the above-described illustrative embodiment, whereas the controller 200 receives the deflection status signal from the piezoelectric detector 800 in this illustrative embodiment.

Another Illustrative Embodiment

Figure 10:
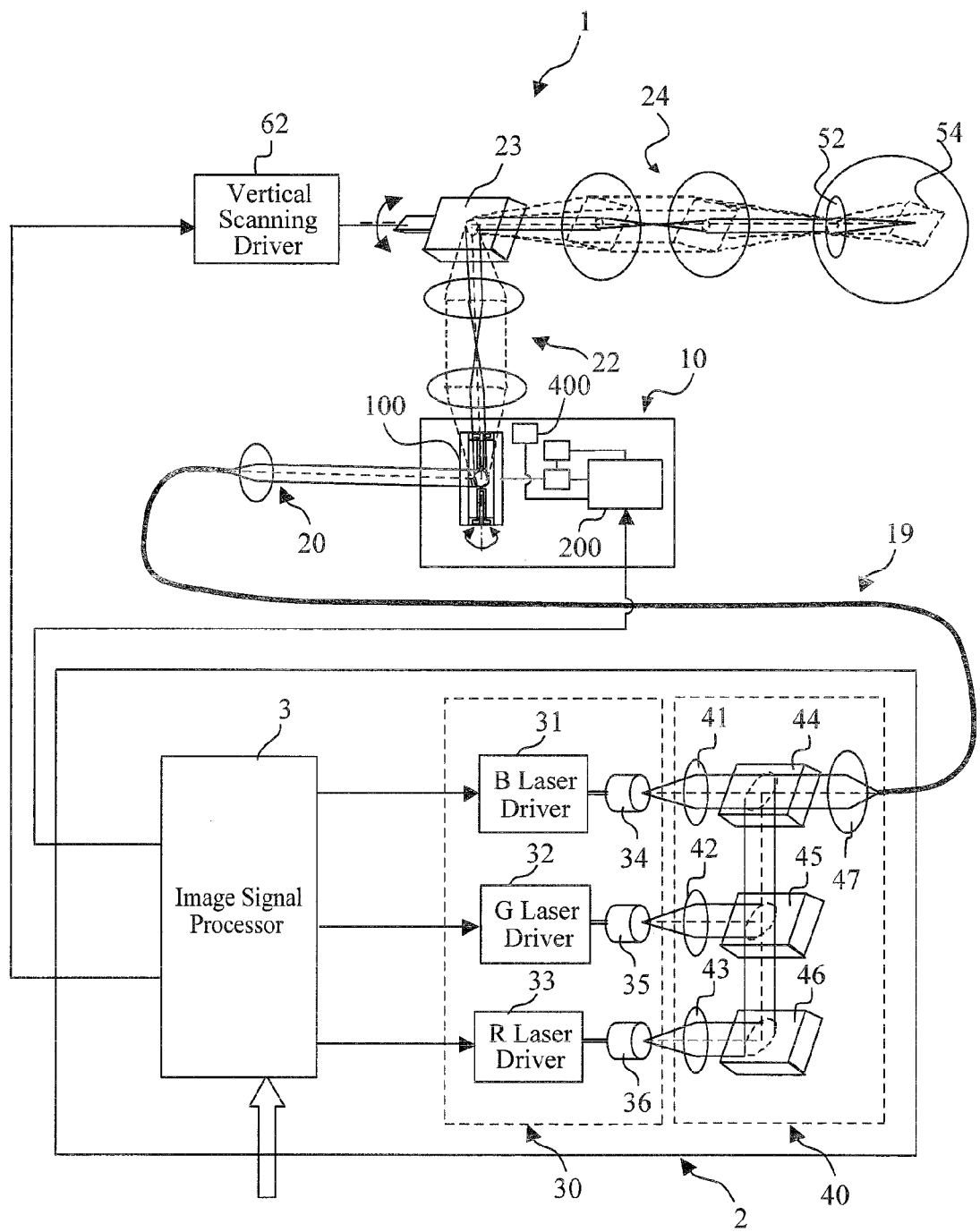
FIG. 10 is a view illustrating a whole structure of an image display apparatus 1.

The optical scanners 10, 11, 12 in the above-described illustrative embodiments can be used in an image display apparatus 1. The image display apparatus 1 shown in FIG. 10 is an apparatus that project an image on a retina 54 of an observer with the light incident on a pupil 52, thereby allowing the observer to see a virtual image. This apparatus is also called as a retinal imaging display.

The image display apparatus 1 includes a light generator 2, an optical fiber 19, a collimate optical system 20, the optical scanner 10, a first relay optical system 22, a vertical scanner 23 and a second relay optical system 24. The light generator 2 includes an image signal processor 3, a light source unit 30 and an optical multiplexer 40. The optical scanner 11 or optical scanner 12 may be used instead of the optical scanner 10. The image signal processor 3 generates a B signal, a G signal, an R signal, a horizontal synchronizing signal and a vertical synchronizing signal, which are elements for composing images based on image signals supplied from the outside.

The light source unit 30 includes a B laser driver 31, a G laser driver 32, an R laser driver 33, a B laser 34, a G laser 35 and an R laser 36. The B laser driver 31 drives the B laser 34 so as to generate blue light having an intensity in accordance with a B signal from the image signal processor 3. The G laser driver 32 drives the G laser 35 so as to generate green light having an intensity in accordance with a G signal from the image signal processor 3. The R laser driver 33 drives the R laser 36 so as to generate red light having an intensity in accordance with an R signal from the image signal processor 3. The B laser 34, the G laser 35 and the R laser 36 may be configured by a semiconductor laser or a solid laser having harmonic producer.

The optical multiplexer 40 includes collimate optical systems 41, 42, 43 that collimate the laser light, dichroic mirrors 44, 45, 46 that multiplex the collimated laser light and a collecting optical system 47 that guides the multiplexed laser light to the optical fiber 19. The blue laser light emitted from the B laser 34 is collimated by the collimate optical system 41 and then incident onto the dichroic mirror 44. The green laser light emitted from the G laser 35 is collimated by the collimate optical system 42 and then incident onto the dichroic mirror 45. The red laser light emitted from the R laser 36 is collimated by the collimate optical system 43 and then incident onto the dichroic mirror 46. The laser lights of three primary colors, which are respectively incident onto the dichroic mirrors 44, 45, 46, are reflected or transmitted in a wavelength selection manner and multiplexed into one light that is then incident onto the collecting optical system 47. The multiplexed laser light is collected by the collecting optical system 47 and then incident to the optical fiber 19.

The optical scanner 10 is driven in accordance with a control signal from the image signal processor 3. A vertical scanning driver 62 drives the vertical scanner 23 in accordance with a control signal from the image signal processor 3. The laser light is converted into a light horizontally and vertically scanned and then allowed to be projected as an image by the optical scanner 10 and the scanning of the vertical scanner 23. Specifically, the laser light emitted from the optical fiber 19 is converted into collimated light by the collimate optical system 20 and then guided to the deflection mirror 111 of the scanner base body 100. The laser light that is horizontally scanned by the deflection mirror 111 passes through the first relay optical system 22 and is then incident on the vertical scanner 23 as parallel light. At this time, an optical pupil is formed at the position of the vertical scanner 23 by the first relay optical system 22. The laser light that is vertically scanned by the vertical scanner 23 passes through the second relay optical system 24 and is then incident on the pupil 52 of the observer as parallel light. Herein, the pupil 52 of the observer and the optical pupil at the position of the vertical scanner 23 have a conjugate relation by the second relay optical system 24.

Another Illustrative Embodiment

Figure 11A:
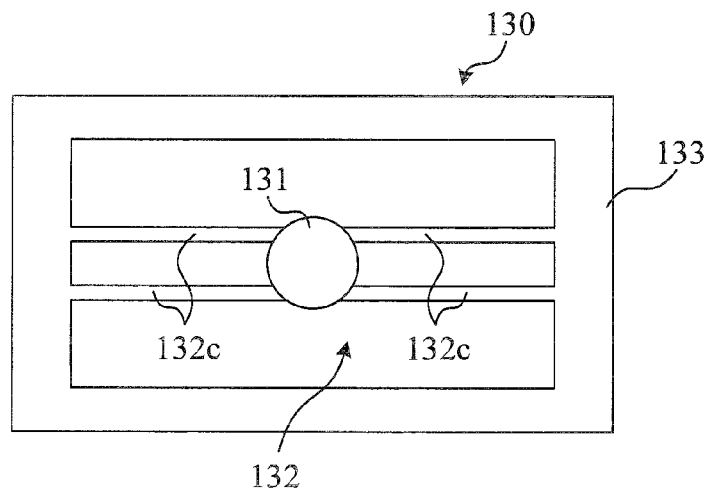
FIG. 11A is a plan view showing a shape of a scanner base body 130.
Figure 11B:
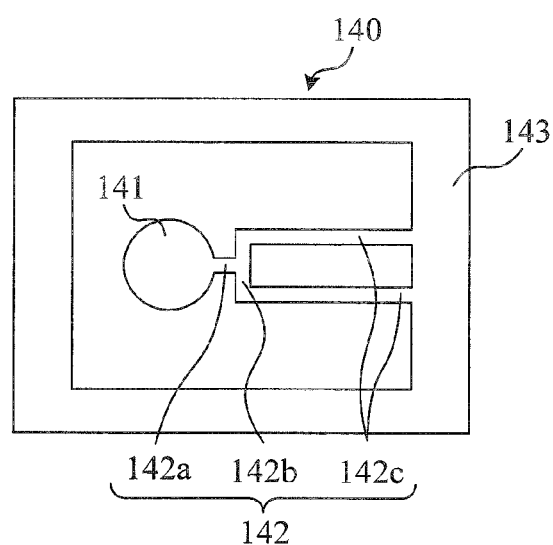
FIG. 11B is a plan view showing a shape of a scanner base body 140.
Figure 11C:
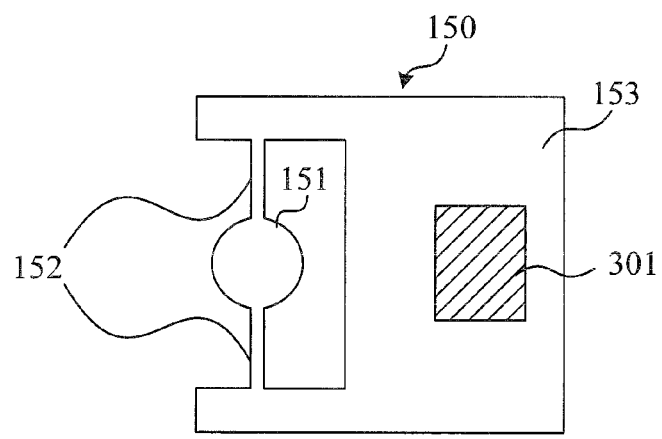
FIG. 11C is a plan view showing a shape of a scanner base body 150.

In the above-described illustrative embodiments, the scanner base body 100 has the shape shown in FIG. 3. However, the scanner base body may have the other shapes. For example, like a scanner base body 130 shown in FIG. 11A, a support beam 132 may consist of a pair of beam parts 132c only. In this case, a deflection mirror 131 and an outer frame 133 are directly connected by the pair of beam parts 132c only. Alternatively, like a scanner base body 140 shown in FIG. 11B, a support beam 142 may be provided at one side only for supporting a deflection minor 141 at one side thereof only. Alternatively, like a scanner base body 150 shown in FIG. 11C, a deflection mirror 151 may be supported at both sides by a pair of support beams 152. The scanner base body 150 is configured in such a way that the deflection mirror 151 and the support beams 152 are oscillated by plate waves of a substrate 153 induced by a drive unit 301 provided on the substrate 153 (for example, refer to JP-A-2006-293116). For example, the scanner base body may have an arbitrary shape as long as the scanner base body has a non-linear frequency characteristic. In addition, the substrate 153 is shown in FIG. 11C.

In the above-described illustrative embodiments, the start-up sequence process shown in FIG. 5 is executed one time only before the optical scanner 10 is driven (refer to step S3 to step S5 in FIG. 4). However, the start-up sequence may be appropriately executed during the driving of the optical scanner 10. For example, a process of determining whether to carry out the start-up sequence may be made during the driving of the optical scanner 10 and the start-up sequence may be performed when the result of the determination is positive. When determining whether the start-up sequence is carried out, it may be used a determination of whether a predetermined time period has passed or whether an instruction to execute the start-up sequence is inputted from the outside.

Advantageous Effects of Illustrative Embodiments

As described above, the loop of step SA3 to SA8 in FIG. 5 is repeated, so that the drive frequency of the drive signal is upswept from a frequency lower than the frequency $f_A$. When the upswept drive frequency exceeds the frequency $f_B$, the dropping phenomenon occurs. In step S13, a drive frequency that is lower than the drive frequency at which the dropping phenomenon occurs by a predetermined value is determined as a target drive frequency. Then, after the drive frequency is again upswept by the process of step SA15 to step SA21, the scanner base body is driven by the target drive frequency. Accordingly, it is possible to drive an optical scanner having a non-linear frequency characteristic while realizing a large deflection angle and a stable driving against the disturbances at the same time.

In step SA4 of FIG. 5, after the drive frequency is incremented by a predetermined frequency step, the drive frequency is kept constant for a predetermined time period. When the Q value of the scanner base body 100 is high, some amount of time is necessary after the drive frequency of the drive signal is changed until the deflection status of the scanner base body 100 is stabilized. When the drive frequency is continuously incremented under status that the deflection status of the scanner base body 100 is not stabilized, the dropping phenomenon may not be appropriately detected. Accordingly, the drive frequency is kept constant for a predetermined time period in step S4. As a result, even when the Q value of the scanner base body 100 is high, the dropping phenomenon is appropriately detected.

In step SA9, it is determined whether the decrease of the deflection status is the dropping phenomenon. Accordingly, when the deflection status is decreased, it is possible to discriminate whether the decrease indicates a peak of the deflection status or the dropping phenomenon.

In step SA13, a drive frequency that is lower than the drive frequency at which the dropping phenomenon occurs by a predetermined value is determined as a target drive frequency. The optical scanner 10 is driven by the target drive frequency, so that it is possible to avoid the dropping phenomenon even when the resonance frequency of the optical scanner 10 is changed by the disturbances such as temperature change and secular change.

In the processes of step SA15 to step SA21, as the drive frequency approaches the target drive frequency, the frequency incremental step of the drive frequency is narrowed. When the drive frequency is highly distant from the target drive frequency, the frequency incremental step of the drive frequency is wide, so that it is possible to rapidly reach the drive frequency to the target drive frequency. In addition, when the drive frequency is close to the target drive frequency, the frequency incremental step of the drive frequency is narrow, so that it is possible to match the drive frequency with the target drive frequency precisely and reproducibly.

In step S5, the drive frequency of the drive signal is adjusted so that the phase difference coincides with the target phase difference. Even when the resonance frequency of the scanner base body 100 is changed by the disturbances such as temperature change and secular change, the phase difference exhibits an approximately constant value. Therefore, the drive frequency is adjusted so that the phase difference should always coincide with the target phase difference. As a result, it is possible to keep the stable constant driving.

What is claimed is:

1. An optical scanner comprising:
   a scanner base body including:
      a deflection mirror configured to deflect incident light in a predetermined direction;
      a support beam extending from the deflection mirror and supporting the deflection mirror; and
      a fixing part, to which an end of the support beam is connected;
   a drive unit configured to rotationally oscillate the deflection mirror and the support beam, thereby driving the scanner base body;
   a deflection status detector configured to detect a deflection status of the deflection mirror; and
   a controller configured to generate a drive signal for driving the scanner base body with a drive frequency and configured to transmit the drive signal to the drive unit,
   wherein the scanner base body is configured to:
      have a first resonance frequency and a second resonance frequency higher than the first resonance frequency,
      resonate at the second resonance frequency when the drive frequency is increased from a frequency lower than the first resonance frequency,
      resonate at the first resonance frequency when the drive frequency is decreased from a frequency higher than the first resonance frequency, and
      exhibit a dropping phenomenon that the deflection status is decreased when the drive frequency exceeds the second resonance frequency while the scanner base body is driven at the second resonance frequency, and
   wherein the controller includes:
      a first upsweep unit configured to upsweep a drive frequency of the drive signal from a frequency lower than the first resonance frequency;
      a dropping phenomenon detector configured to detect the dropping phenomenon based on a detection result of the deflection status detector;
      a target drive frequency determination unit configured to, when the dropping phenomenon detector detects the dropping phenomenon at a drive frequency during the upsweeping by the upsweep unit, determine a frequency lower than the drive frequency at which the dropping phenomenon is detected, as a target drive frequency;
      a second upsweep unit configured to upsweep the drive frequency of the drive signal toward the target drive frequency from a frequency lower than the first resonance frequency after the operation of the target drive frequency determination unit; and
      an adjustment unit configured to adjust the drive frequency of the drive signal so as to keep the deflection status at the target drive frequency based on the detection result of the deflection status detector after the operation of the second upsweep unit.

2. The optical scanner according to claim 1,
   wherein the first upsweep unit includes:
      a frequency incremental unit configured to increment the drive frequency by a predetermined frequency step; and
      a wait unit configured to keep the same drive frequency for a predetermined time period after the operation of the frequency incremental unit.

3. The optical scanner according to claim 1,
   wherein the dropping phenomenon detector includes:
      a decrease judging unit configured to judge whether the deflection status is decreased based on the detection result of the deflection status detector; and
      a dropping phenomenon judging unit configured to, when the decrease judging unit judges that the deflection status is decreased, judge whether the decrease of the deflection status corresponds to the dropping phenomenon.

4. The optical scanner according to claim 3,
   wherein the controller further includes a memory unit configured to memorize the detection result of the deflection status detector and the drive frequency while being associated with each other, wherein the target drive frequency determination unit is configured to determine a frequency lower than the drive frequency at which the deflection status becomes a maximum as the target drive frequency, based on the memorized content of the memory unit, when the decrease judging unit judges that the deflection status is decreased and when the dropping phenomenon judging unit judges that the decrease of the deflection status does not correspond to the dropping phenomenon.

5. The optical scanner according to claim 1,
wherein the second upsweep unit includes a frequency variably incremental unit configured to increment the drive frequency so that the frequency incremental step of the drive frequency becomes smaller as the drive frequency approaches the target drive frequency.

6. The optical scanner according to claim 1,
wherein the controller further includes:
   a phase determination unit configured to determine a phase of the deflection mirror based on the detection result of the deflection status detector;
   a phase difference determination unit configured to determine a phase difference between the phase of the deflection mirror determined by the phase determination unit and a phase of the drive signal; and
   a target phase difference memory unit configured to memorize the phase difference determined by the phase difference determination unit as a target phase difference after the operation of the second upsweep unit, and
wherein the adjustment unit is configured to adjust the drive frequency of the drive signal so that the phase difference determined by the phase difference determination unit coincides with the target phase difference memorized in the target phase difference memory unit.

7. An image display apparatus comprising:
the optical scanner according to claim 1 for scanning light to form an image;
a light source configured to supply light to the optical scanner; and
an eyepiece optical system configured to guide the light scanned by the optical scanner to an eye of a user.

8. A method of driving an optical scanner configured to have a first resonance frequency and a second resonance frequency higher than the first resonance frequency, resonate at the second resonance frequency when the drive frequency is increased from a frequency lower than the first resonance frequency, resonate at the first resonance frequency when the drive frequency is decreased from a frequency higher than the first resonance frequency, and exhibit a dropping phenomenon that the deflection status is decreased when the drive frequency exceeds the second resonance frequency while the scanner base body is driven at the second resonance frequency, the method comprising:
   first upsweeping a drive frequency of a drive signal to be transmitted to a drive unit configured to drive the optical scanner, from a frequency lower than the first resonance frequency;
   detecting a deflection status of the optical scanner;
   detecting the dropping phenomenon based on a detection result of the deflection status;
   when the dropping phenomenon is detected at a drive frequency during the first upsweeping, determining a frequency lower than the drive frequency at which the dropping phenomenon is detected as a target drive frequency;
   second upsweeping the drive frequency of the drive signal toward the target drive frequency from a frequency lower than the first resonance frequency after determining the target drive frequency; and
   adjusting the drive frequency of the drive signal so as to keep the deflection status at the target drive frequency based on the detection result of the deflection status after the second upsweeping.

9. The method according to claim 8,
wherein the first upsweeping includes:
   incrementing the drive frequency in a predetermined frequency step; and
   keeping the same drive frequency for a predetermined time period after the incrementing of the drive frequency.

10. The method according to claim 8,
wherein the detecting of the dropping phenomenon includes:
   judging whether the deflection status is decreased based on the detection result of the deflection status; and
   judging whether, when it is judged that the deflection status is decreased, the decrease of the deflection status corresponds to the dropping phenomenon.

11. The method according to claim 10, further comprising:
memorizing the detection result of the deflection status and the drive frequency while being associated with each other,
wherein the determining of the target drive frequency includes determining, as the target drive frequency, a frequency lower than the drive frequency at which the deflection status of the optical scanner becomes a maximum, based on the memorized content, when it is judged that the deflection status is decreased and when it is judged that the decrease of the deflection status does not correspond to the dropping phenomenon.

12. The method according to claim 8,
wherein the second upsweeping includes incrementing the drive frequency so that the frequency incremental step of the drive frequency becomes smaller as the drive frequency approaches the target drive frequency.

13. The method according to claim 8, further comprising:
determining a phase of the deflection status of the optical scanner based on the detection result of the deflection status;
determining a phase difference between the determined phase of the deflection status of the optical scanner and a phase of the drive signal; and
memorizing the determined phase difference as a target phase difference after the second upsweeping,
wherein the adjusting adjusts the drive frequency of the drive signal so that the determined phase difference coincides with the memorized target phase difference.

* * * * *